United States Patent
Meer

(10) Patent No.: US 10,047,465 B2
(45) Date of Patent: Aug. 14, 2018

(54) METHOD FOR MANUFACTURING A FIBER COMPOSITE COMPONENT

(71) Applicant: Airbus Defence and Space GmbH, Ottobrunn (DE)

(72) Inventor: Thomas Meer, Egmating (DE)

(73) Assignee: Airbus Defence and Space GmbH (DE)

( * ) Notice: Subject to any disclaimer, the term of this patent is extended or adjusted under 35 U.S.C. 154(b) by 237 days.

(21) Appl. No.: 14/845,468

(22) Filed: Sep. 4, 2015

(65) Prior Publication Data

US 2016/0069009 A1 Mar. 10, 2016

(30) Foreign Application Priority Data

Sep. 5, 2014 (DE) .................. 10 2014 012 915

(51) Int. Cl.
| | | |
|---|---|---|
| *B29C 70/24* | (2006.01) | |
| *D05C 15/16* | (2006.01) | |
| *B32B 5/26* | (2006.01) | |
| *B32B 7/12* | (2006.01) | |
| *D06M 17/04* | (2006.01) | |

(52) U.S. Cl.
CPC ............. *D05C 15/16* (2013.01); *B29C 70/24* (2013.01); *B32B 5/26* (2013.01); *B32B 7/12* (2013.01); *D06M 17/04* (2013.01); *B32B 2260/00* (2013.01); *B32B 2605/18* (2013.01); *Y10T 29/49801* (2015.01)

(58) Field of Classification Search
CPC ..... Y10T 29/49801; B29C 70/24; B32B 7/12; B32B 5/26
See application file for complete search history.

(56) References Cited

U.S. PATENT DOCUMENTS

| | | |
|---|---|---|
| 4,659,412 A | 4/1987 | Newman et al. |
| 5,545,276 A | 8/1996 | Higgins |
| 2004/0067705 A1 | 4/2004 | Ton-That et al. |

(Continued)

FOREIGN PATENT DOCUMENTS

| | | |
|---|---|---|
| DE | 26 32 569 A1 | 3/1977 |
| DE | 35 87 136 T2 | 6/1993 |
| DE | 695 33 281 T2 | 7/2005 |

(Continued)

OTHER PUBLICATIONS

Ginger Gardiner, Certification of bonded composite primary structures, Composites World, Mar. 2014 (posted Mar. 4, 2014).

(Continued)

*Primary Examiner* — Jermie Cozart
(74) *Attorney, Agent, or Firm* — Lerner, David, Littenberg, Krumholz & Mentlik, LLP

(57) ABSTRACT

A fiber composite component includes a composite including cured matrix material and a fiber material embedded therein. At least one partial area of the fiber composite component is provided with at least one thread, which undulates as it extends along a surface area of the composite, so that sections of the thread alternately run inside of the composite and outside of the composite. An adhesive arrangement for such fiber composite components is also disclosed. Finally, methods for manufacturing such a fiber composite component or for manufacturing such an adhesive arrangement are disclosed.

8 Claims, 3 Drawing Sheets

(56) References Cited

U.S. PATENT DOCUMENTS

| | | | | |
|---|---|---|---|---|
| 2009/0280294 A1* | 11/2009 | Branca | ............... | B29C 70/086 |
| | | | | 428/138 |
| 2009/0301644 A1* | 12/2009 | Cahuzac | ............... | B29C 70/08 |
| | | | | 156/182 |
| 2010/0209658 A1* | 8/2010 | Roth | ............... | B29C 70/086 |
| | | | | 428/102 |
| 2010/0236212 A1* | 9/2010 | Weber | ............... | B29C 70/24 |
| | | | | 57/267 |
| 2010/0266833 A1* | 10/2010 | Day | ............... | B29C 44/1285 |
| | | | | 428/304.4 |
| 2012/0100354 A1* | 4/2012 | Beraud | ............... | B29B 11/16 |
| | | | | 428/212 |
| 2013/0236686 A1* | 9/2013 | Horibe | ............... | B32B 5/026 |
| | | | | 428/114 |
| 2014/0134391 A1* | 5/2014 | Lumb | ............... | B32B 7/08 |
| | | | | 428/102 |

FOREIGN PATENT DOCUMENTS

| | | |
|---|---|---|
| DE | 10 2009 039 578 A1 | 3/2011 |
| EP | 0 491 645 A1 | 6/1992 |
| GB | 1552414 A | 9/1979 |
| JP | S60-222 233 A | 11/1985 |
| WO | 95/23179 A1 | 8/1995 |

OTHER PUBLICATIONS

Extended European Search Report dated Jan. 27, 2016 (EP 15183713.5).
German Office Action dated Apr. 17, 2015 (DE 10 2014 012 915.2).

* cited by examiner

METHOD FOR MANUFACTURING A FIBER COMPOSITE COMPONENT

FIELD OF THE INVENTION

The present disclosure relates to a fiber composite component comprising a composite consisting of cured matrix material and a fiber material embedded therein. The disclosure further relates to an adhesive arrangement for such fiber composite components. Finally, the disclosure relates to a method for manufacturing such a fiber composite component or for manufacturing such an adhesive arrangement.

BACKGROUND OF THE INVENTION

Fiber composite components as well as methods for manufacturing fiber composite components are well known from prior art. Fiber composite components are currently becoming increasingly important as lightweight structures in vehicle construction (including aircraft and spacecraft), for example.

In particular in order to develop larger lightweight structures, it is often required that several already cured fiber composite components be joined together later, which is also referred to as "structural bonding" or "secondary bonding". This makes it relatively easy to also fabricate larger overall structures, e.g., aircraft fuselages or sections thereof.

Alternatively or additionally, it is often required that add-on components be attached to an already cured fiber composite component, which can also involve fiber composite components or other types of components (e.g., made of metal or plastic). In aircraft construction, e.g., in the aircraft fuselage area, such add-on components can in particular be frames, stringers, ribs, clips and the like, for example.

In aircraft construction, joints are currently being fabricated in the structural area by means of rivets, or by means of rivets with an additional adhesive. However, rivets require providing a minimum component thickness and drilling a hole. This is associated with a higher weight, damage to load-bearing fibers in the fiber composite component, and a drilling dust load (resulting in a risk of corrosion and short circuiting, for example).

For this reason, there may be a need that adhesive bonds in the future be increasingly realized at a later point, and here that the number of installed rivets be largely reduced, or that rivets be eliminated entirely.

However, the basic problem with the adhesive arrangement of the kind of interest here involves ensuring a sufficient residual strength given a partial failure of the bond (damage tolerance). Today, the rivet in question ensures the redundant load path.

There may be a need to indicate a new way to fabricate an adhesive arrangement for fiber composite components (i.e., with at least one bonding component being designed as a fiber composite component), in which an improved strength and reliability can be achieved.

BRIEF SUMMARY OF THE INVENTION

A fiber composite component according to the disclosure is characterized in that at least one partial area of the fiber composite component is provided with at least one thread, which undulates as it extends along a surface area of the composite, so that sections of the thread alternately run inside of the composite and outside of the composite.

As a consequence, the fiber composite component as a whole advantageously has no more or less smooth surface, but rather has "thread loops" in one surface area of at least one partial area (which can be provided as an adhesive surface during subsequent bonding) that protrude from the surface area, and are formed by the thread sections running outside of the composite.

When the fiber composite component is later adhesively bonded with another fiber composite component (or with another type of component), these protruding "thread loops" can be embedded into the respective adhesive layer, and thus be to some extent form-locked (positive locking fit) therein.

This positive locking fit advantageously enhances the adhesion-based gluing effect between the adhesive layer and adhesive surfaces in terms of both strength and reliability. In particular, the positive locking fit offers a certain residual strength and tear stopper function given an adhesive failure of the bond.

In particular thermosetting plastics, i.e., resins or resin systems (e.g., epoxy resin systems), are possible as the matrix material for the fiber composite component according to the disclosure. However, the matrix material can alternatively also consist of a thermoplastic.

For example, the fiber material embedded in the matrix material can contain carbon fibers, glass fibers or other fibers, whether it be short fibers, e.g., fibers tangled in the matrix material, and/or long fibers. In an embodiment, the fiber material consists of at least one textile layer, or contains at least one such textile layer (e.g., nonwoven fabrics, braidings, woven fabrics, rovings, etc.). Corresponding semi-finished textile layers are well known from the field of fiber composite technology, and, in order to manufacture the fiber composite component, advantageously also using established methods, can in the course of the disclosure be infiltrated with initially still liquid or viscous matrix material, which cures as the process continues. Alternatively or additionally, one or more semi-finished textile layers already pre-impregnated with uncured matrix material (so-called "prepregs") can be used in manufacturing the fiber composite component.

In an embodiment, the fiber composite component is designed as a plate-shaped or shell-shaped fiber composite component, e.g., with a minimal lateral dimension of greater than 100 times, in particular of greater than 1000 times, the maximum thickness of the component.

In particular in a plate-shaped or shell-shaped fiber composite component, the fiber material can comprise several textile layers stacked together (e.g., nonwoven fabrics, braidings, woven fabrics, etc.), e.g., to realize specific fiber directions or distributions of fiber directions in the fiber composite component.

In the simplest case, the fiber composite component consists only of the cured matrix material, the fiber material embedded therein, and the at least one thread sectionally embedded therein. Alternatively, however, the fiber composite component can also comprise additional components, e.g., in particular one or more surface layers and/or one or more intermediate layers situated inside of the composite.

Let it be understood that the thread(s) of the fiber composite component is/are only required for improving an adhesive bond as described above at locations where such an adhesive bond is actually to be created at a later point. Therefore, the arrangement of the "partial area(s)" where the thread loops are required can be tailored to the desired arrangement of the subsequent adhesive bond(s) while manufacturing the fiber composite component.

In particular for relatively large-format fiber composite components (e.g., fuselage sections of an aircraft), it can often be sufficient for the surface of the composite lying in the partial area(s) and occupied by the mentioned "thread loops" to take up less than 10%, in particular less than 5% of the overall surface of the composite. However, the respective application or intended "adhesive geometry" is basically also crucial for such structural components of a vehicle, e.g., in particular an aircraft. The reinforcement provided according to the disclosure by thread loops or "tuft loops" is only necessary in the bonding area, and even there only in especially critical areas, i.e., where peak loads can be expected in situations where in use (e.g., stringer outlet).

For example, in a plate-shaped or shell-shaped fiber composite component, it may be expedient to provide the partial area (or one of several partial areas) on an edge of the fiber composite component, so as to provide an adhesive bond at this edge with an additional plate-shaped or shell-shaped component (e.g., fiber composite component). Alternatively or additionally, the partial area or an additional partial area can also be provided distant from the fiber composite component edge, for example given the adhesive attachment of add-on components (e.g., frames and stringers on the interior side of a shell-shaped fiber composite fuselage section).

Within the meaning of the disclosure, the term "thread" must be interpreted very broadly, and within the meaning of the disclosure is intended to comprise any linear textile structure, i.e., a long, thin structure comprised of one or more fibers.

In an embodiment, the thread consists of just a single fiber ("monofilament").

In another embodiment, the thread comprises several fibers twisted together and/or joined together in some other way.

In another embodiment, the thread comprises several fibers running parallel to each other (usually referred to as "roving"), e.g., more than 100 fibers running parallel to each other.

As already explained, the thread sections (thread loops) running outside of the composite serve to improve the strength or reliability of an adhesive bond produced by an adhesive layer in which the thread sections (thread loops) located outside of the composite are embedded.

In this regard, it normally makes sense for the thread sections running outside of the composite to each have a length on the same scale as the thickness of the respective adhesive layer. For example, if these thread sections have a length corresponding to the thickness of the adhesive layer, the thread loops formed by the thread sections can extend up until the middle of the adhesive layer, which enables a good anchoring. Depending on the specific progression of the thread loops protruding from the composite, these thread loops can also project into the adhesive layer to less of an extent in the above example (thread section length=adhesive layer thickness).

An embodiment envisages that the thread sections running outside of the composite each have a length of at least 10%, in particular of at least 20%, of the provided adhesive layer thickness.

An embodiment envisages that the thread sections running outside of the composite each have a length of at most 500%, in particular of at most 200%, of the planned adhesive layer thickness.

An embodiment provides that the thread sections running outside of the composite each have a length of at least 0.2 mm, in particular of at least 0.4 mm.

An embodiment provides that the thread sections running outside of the composite each have a length of at most 15 mm, in particular of at most 10 mm.

The thread should be well anchored in both the composite and the subsequent adhesive layer. From this point of view, it is especially preferred that at least 20%, in particular at least 30%, of the thread run inside of the composite, and/or that at least 30%, in particular at least 40%, of the thread run outside of the composite.

How far the thread should extend into the composite (e.g., multi-layer laminate) depends on the application. This depth determines how far the load is relayed into the composite via the thread loops and thread sections connected thereto, e.g., given a failure of the bond. However, it must be remembered in this conjunction that the thread as such represents a disturbance relative to the composite structure. It is often sufficient and advantageous if the thread does not run through the entire composite thickness, but rather extends into the composite by less than 90% of the composite thickness, in particular less than 70% of the composite thickness, for example.

In addition, how densely the thread sections (thread loops) running outside of the composite are distributed over the surface area(s) of the respective partial area(s) of the fiber composite component is important with respect to the desired improved adhesive bond.

An embodiment envisages that the thread sections running outside of the composite in the surface area of a partial area be provided with a density of at least 5,000/qm, in particular of at least 10,000/qm.

The upper limit for this density is essentially determined by what is technically feasible (and depends on the thickness of the used thread). One embodiment provides that the aforementioned density measure at most 300,000/qm, in particular at most 200,000/qm.

As concerns the thread thickness, the thread should on the one hand be as thin as possible, so as to pose the least possible disruption to the composite structure, and beyond that to be able to realize an optimal adhesive layer thickness (often preferably ranging from 0.4 mm to 0.6 mm). On the other hand, however, the thread loops must remain sufficiently strong and producible.

An embodiment provides that the thickness of the thread measure at least 10 μm, in particular at least 20 μm.

An embodiment provides that the thickness of the thread measure at most 0.5 mm, in particular at most 0.1 mm.

An embodiment provides that the thread run along a straight line in the partial area in the sense that those locations on the surface area where the undulating thread progression crosses the composite surface lie along a straight line. As an alternative to such a straight progression, however, the threads can conceivably also follow an undulating or zigzag pattern, for example.

An embodiment provides that several threads run in the partial area in such a way that several are designed as thread progressions running parallel to each other along the surface area, e.g., as several respectively straight thread progressions parallel to each other (alternatively: Several respectively undulating or zigzagging thread progressions parallel to each other, for example). As an alternative to such a parallel progression of several threads, the threads can conceivably also cross each other, for example, e.g., so that the load can be distributed over a larger surface.

In another aspect of the disclosure, the need mentioned at the outset is achieved with an adhesive arrangement for fiber composite components comprising a first component with a first adhesive surface, a second component with a second adhesive surface, and an adhesive layer between the first adhesive surface and second adhesive surface for adhesively bonding the two components with each other, wherein the first component and/or the second component are designed as a fiber composite component of the kind described herein, and thread sections (thread loops) of the fiber composite component(s) running outside of the composite are embedded in the adhesive layer.

A more special embodiment of the adhesive arrangement provides that both the first component and second component be designed as a fiber composite component of the kind described herein, so that thread sections of both components running outside of the two composites are advantageously embedded in the adhesive layer. The partial area(s) of the two fiber composite components can here be arranged correspondingly to each other in such a way that one or more corresponding (essentially congruent) pairs comprised of a respective "first adhesive surface" and a respective "second adhesive surface" are created in the adhesive arrangement.

With respect to any adhesive attachment of add-on components to the fiber composite component(s) to be adhesively bonded, the respective fiber composite component can also be provided with one or several partial areas used for adhesively bonding such (additional) add-on components.

The adhesive layer of the adhesive arrangement can consist of any material suitable for adhesively bonding the respective adjoining materials, wherein the materials to be preferred or selected are of course those which exhibit an especially high adhesion relative to the adjoining materials or matrix materials (or possibly surface layer materials) in the adhesive arrangement.

Possible for use as adhesives within the course of the disclosure are both physically setting adhesives, such as hot-melt adhesives, and chemically setting adhesives, such as polymerization adhesives, polycondensation adhesives, polyaddition adhesives, etc.

In an embodiment, the thickness of the adhesive layer measures at least 0.05 mm and/or at most 10 mm.

Adhesive layer thicknesses ranging from 0.1 mm to 0.7 mm are of special interest for structural bonds in the structural components of an aircraft. As a rule, the optimum strength measures approx. 0.5 mm. However, adhesive thicknesses of up to approx. 4 mm and partially higher than that are indeed also possible within the course of the disclosure (conventional designs of which offer a distinctly poorer performance).

All special configurations and embodiments described above with reference to the fiber composite component according to the disclosure can be analogously drawn upon for configuring or further developing the adhesive arrangement according to the disclosure.

In another aspect of the disclosure, the need set at the outset is achieved by a method for manufacturing a fiber composite component of the type described herein, comprising at least the following method steps:
a) Providing a fiber material.
b) Introducing at least one thread into at least one partial area of the fiber material, such that the thread undulates as it extends along a surface area of the fiber material, such that sections of the thread alternately run inside of the fiber material and outside of the fiber material,
c) Infiltrating the fiber material with a curable matrix material, and
d) Curing the matrix material.

With respect to the fiber material configuration, let reference be made to the explanations already given above while describing the fiber composite component, for example as concerns the type of fibers (e.g., carbon fibers, glass fibers, etc.) along with their arrangement (e.g., as individual fibers or as a single- or multi-layer textile).

As regards the sequence of the above steps "a" to "d" for manufacturing the fiber composite component, one embodiment provides that these steps be performed in the sequence as indicated (i.e., "a, b, c, d").

In another embodiment, step b, i.e., introducing the at least one thread into the fiber material, takes place only after step c, i.e., only after the fiber material has already been infiltrated with the curable matrix material. According to this embodiment, then, the sequence of steps b and c is reversed (a, c, b, d). Steps a and c can in this respect here also be "combined" into a first procedural step or replaced by such a step, in which a fiber material already infiltrated with matrix material ("prepreg") is provided.

In another embodiment, step b, i.e., introducing the at least one thread into the fiber material, can in particular be effected in such a way as known for "tufting", e.g., from the area of manufacturing loop piles (e.g., carpets).

With respect to step b, all methods known from the area of tufting can be advantageously drawn upon within the course of the disclosure, along with tools for performing such a tufting procedure.

Tufting is an established procedure in the textile industry for manufacturing loop piles, such as carpets. A needle is here used to repeatedly puncture one side of a flat textile with (at least) one thread. For example, friction causes the thread to remain in the textile when taking out the needle, forming a thread loop on the other side of the textile.

The tufting procedure described above can also be used in a method for manufacturing a fiber composite component according to the disclosure, i.e., the thread can be passed (in vertical direction) through the fiber material from one side ("lower side") of a flat fiber material by means of a needle (or a plurality of threads parallel to each other by means of multiple needles), so as to form the desired thread loops of the fiber material on the opposing other side ("upper side").

While cutting through the individual thread loops, e.g., as envisaged during the manufacture of so-called velour carpets, is not to be precluded within the course of the disclosure, it is normally unnecessary within the course of the disclosure, or rather tends to be counterproductive in terms of improving the adhesive bond.

If the fiber composite component to be manufactured is to have a relatively thick composite (comprised of cured matrix material and fiber material embedded therein), a correspondingly thick fiber material (taking into account any potential subsequent compacting of the fiber material in a curing process), e.g., in particular a multi-layer laminate consisting of textile layers stacked together, can be provided for this purpose, in which the (at least one) thread is introduced before or after infiltration of the matrix material.

However, in a method which is often more advantageous in this regard, only a portion of the required fiber material or ultimately required fiber material thickness is initially provided in step a, and more or the remaining still required fiber material is attached to the "lower side" (opposite to the fiber material surface or side equipped with the thread loops) as the process continues, only after step b (introducing the thread) has concluded. Fiber material that is either dry or already infiltrated with matrix material can here be attached as well (e.g., comprising one or several textile layers), so that the entire fiber material is only then cured as a whole, or first infiltrated with matrix material as needed and then cured.

In an embodiment, the fiber material is provided with a cover layer (e.g., separating foil, or tear-off layer) in step a, at least on the surface area of the partial area on which the thread later extends.

Such a cover layer makes it possible to achieve various advantages.

Firstly, such a cover layer can stabilize the fiber material in step b (introducing the thread) as performed later as the process continues by more effectively holding together the fibers in the fiber material, e.g., when puncturing the fiber material with a needle (tufting needle).

Another possibility involves using such a cover layer as a matrix material barrier in step c (infiltrating the fiber material) as performed later as the process continues to prevent the matrix material from exiting the fiber material toward the thread loops on the surface.

Further, if the cover layer does not act as such a matrix material barrier and the thread loops are also embedded into the matrix material in step c, the matrix material surrounding the thread loops must subsequently be removed, for which purpose the cover layer may be useful (as will be described further below).

Finally, if the cover layer acts as a so-called tear-off layer, i.e., is again peeled away from the composite after step d (curing the matrix material), a correspondingly structured tear-off layer makes it possible to achieve a correspondingly structured composite surface, which ensures a stronger adhesion of the subsequent adhesive layer to the composite surface.

Accordingly, if the surface area of the fiber material is made available or provided with a cover layer in the partial area of the fiber material in step a or thereafter (but before step b), a further development provides that this cover layer be peeled away from the composite again as the process continues after step d (curing the matrix material).

If the thread loops generated in step b are surrounded with matrix material as the process continues, one embodiment provides in step d that this matrix material surrounding the thread loops also be firstly cured, and that this matrix material surrounding the thread loops subsequently be removed again.

For example, one embodiment provides for this purpose that the cured matrix material surrounding the thread loops be removed with the help of a laser, if necessary assisted by peeling away a cover layer previously situated in the surface area (e.g., acting as a separating foil and/or tear-off layer).

When using a laser to remove cured matrix material, the composition or material of any cover layer present can be selected so that the cover layer acts as a barrier to the respective laser beam and/or heat generated by the laser beam, in order to protect the cured matrix material located under the cover layer against damage by the laser or the resultant heat buildup.

In another aspect of the disclosure, the need set at the outset is achieved by a method for manufacturing an adhesive arrangement of the type described herein, in which a first component is provided with a first adhesive surface, and a second component is provided with a second adhesive surface, wherein the first component and/or second component is designed as a fiber composite component according to the disclosure and/or was manufactured using a method according to the disclosure for manufacturing a fiber composite component, and the two components are adhesively bonded to each other by providing an adhesive layer between the first adhesive surface and second adhesive surface, so that thread sections (thread loops) of the fiber composite component(s) running outside of the composite are embedded into the adhesive layer.

The configurations and further developments already described above with reference to the fiber composite component according to the disclosure and/or the method according to the disclosure for manufacturing a fiber composite component can be drawn upon for providing the two components, insofar as related to the provision of a fiber composite component according to the disclosure.

For example, adhesive bonding can take place in the usual manner by applying an adhesive layer onto one or both adhesive surfaces, and then joining the two components on the adhesive surfaces, if necessary with the use of pressure and, e.g., an increased temperature.

According to another aspect of the disclosure it is proposed that the described adhesive arrangement be used to create a solid structure of a vehicle, in particular an aircraft.

BRIEF DESCRIPTION OF THE DRAWINGS

The disclosure will be explained in more detail below based on exemplary embodiments with reference to the attached drawings. Shown on.

DETAILED DESCRIPTION

FIGS. 1 to 4 schematically illustrate an exemplary embodiment of a method for manufacturing a fiber composite component 10.

Figure 5:
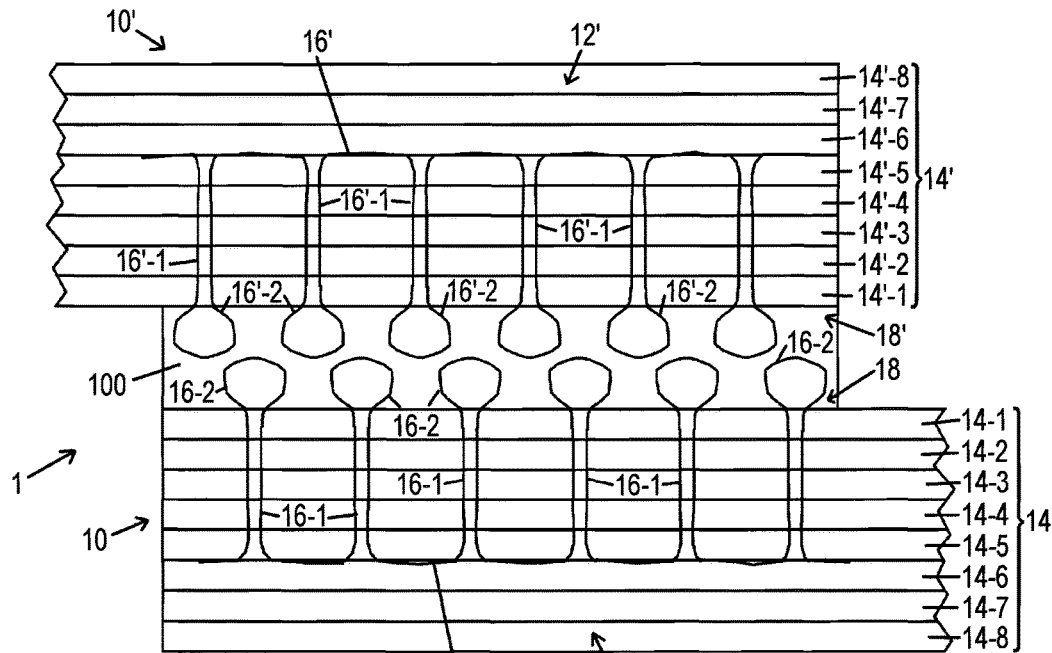
FIG. 5 is a schematic view to illustrate an adhesive arrangement comprising two fiber composite components manufactured according to FIGS. 1 to 4, which were bonded with each other with an adhesive layer.

Evident from FIG. 5 is the finished fiber composite component 10, specifically in a usage situation where it is bonded with a second fiber composite component 10' manufactured in the same way by means of an adhesive layer 100 (adhesive arrangement 1).

The fiber composite component 10 (see FIG. 5) conventionally comprises a composite 12 comprised of cured matrix material (e.g., here a thermally cured epoxy resin system) and fiber material 14 embedded herein.

In the exemplary embodiment shown, the fiber material 14 consists of eight textile layers 14-1 to 14-8. Of course, this number of layers must only be construed as an example, and can vary widely in practice as a function of the application.

In one characteristic of the fiber composite component 10, at least one thread 16 is provided in at least one partial area (the area adjacent to the adhesive layer 100 on FIG. 5) of the fiber composite component 10, which undulates as it extends along a surface area 18 of the composite 12 in such a way that sections of the thread 16 alternately run inside of the composite 12 and outside of the composite 12. On FIG. 5, the thread sections running inside of the composite 12 are labeled 16-1, and the thread sections running outside of the composite 12 are labeled 16-2.

In the adhesive arrangement 1 on FIG. 5, the thread sections 16-2 running outside of the composite are advantageously embedded into the adhesive layer 100, so that the positively embedded thread sections 16-2 enhance the adhesion of the adhesive layer 100 relative to the surface area 18 in terms of the strength and reliability of the adhesive bond.

With reference to FIGS. 1 to 4, the method for manufacturing the fiber composite component 10 can be described as follows:

In a first step, a fiber material is provided. In the example shown (see FIG. 1), these are only the semi-finished textile layers 14-1 to 14-5, wherein this stack of fiber materials is provided with a separating foil 20, at least in the partial area that subsequently forms the surface area 18.

In the example shown, the fiber material is a dry fiber material, i.e., one that does not yet contain any matrix material. Alternatively, however, one, several or all of the semi-finished textile layers 14-1 to 14-5 could also be provided as prepregs (which are then no longer to be infiltrated with matrix material as the process continues).

In a second step, the at least one thread 16 is introduced into the provided fiber material 14-1 to 14-5, such that the thread 16 undulates while extending along the surface area 18, such that thread sections alternately run inside of the fiber material 14-1 to 14-5 and outside of the fiber material 14-1 to 14-5. The thread sections running inside and outside of the fiber material are again labeled 16-1 and 16-2 on FIG. 1 (corresponds to FIG. 5).

The thread 16 is introduced just as when "tufting", i.e., the thread 16 is passed through the fiber material by means of a needle 22 from a flat side of the fiber material 14-1 to 14-5 (from below on FIG. 1), wherein the needle 22 is guided (upwardly on FIG. 1) to a point where a "thread loop" 16-2 is formed when subsequently drawing back the needle 22. On FIG. 1, the needle 22 is then moved a bit toward the right, and the process of puncturing and again retracting the needle 22 to create the next thread loop 16-2 is repeated. As a result of this "tufting process", the thread 16 can be used to generate the desired number of thread loops 16-2 in the respective partial area. As in the case when tufting loop piles (e.g., carpets), multiple needles (multi-needle) or a row of needles (which row extends orthogonally to the drawing plane on FIG. 1) can be used to simultaneously introduce a corresponding plurality of threads 16, wherein a corresponding plurality of thread loops 16-2 is formed with each stroke of the multiple needles.

For the sake of simplicity, only one such thread 16 is depicted on the figures.

Figure 1:
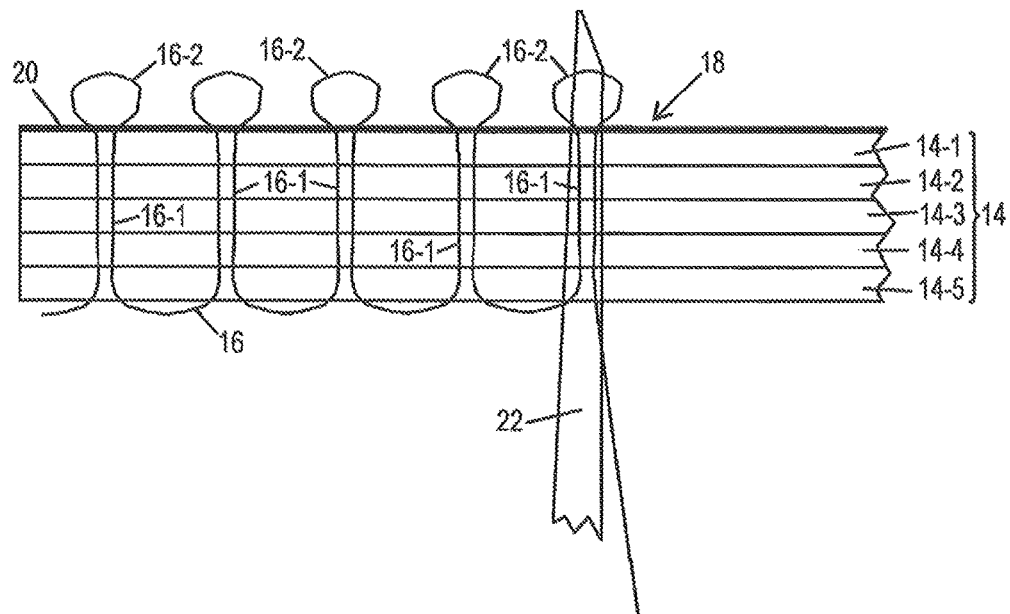
FIG. 1 is a schematic view to illustrate how a thread is introduced into a fiber material ("tufting")
Figure 2:
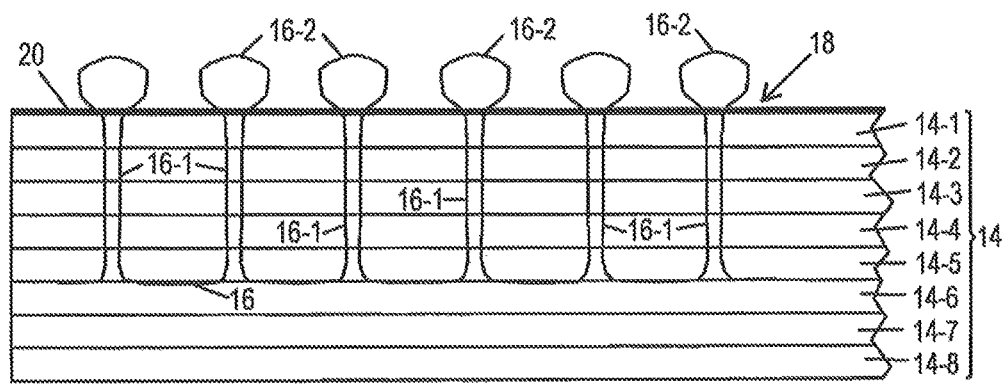
FIG. 2 is a view corresponding to FIG. 1 after attaching additional fiber material layers.

As shown on FIG. 2, the "tufted" fiber material comprised of the semi-finished layers 14-1 to 14-5 is then enhanced on the lower side (facing away from thread loops 16-2) with the remaining semi-finished layers 14-6 to 14-8 still needed for the fiber composite component 10.

In the example shown, the semi-finished layers 14-6 to 14-8 consist of dry fiber material, i.e., one that does not yet contain any matrix material. Alternatively, however, one, several or all of the semi-finished textile layers 14-6 to 14-8 attached on the side facing away from the thread loops 16-2 in this stage of the procedure can also be provided as prepregs (which are then no longer to be infiltrated with matrix material as the process continues).

If the semi-finished layers 14-1 to 14-8 have not yet been infiltrated with matrix material in this situation, these semi-finished layers are then correspondingly infiltrated with curable matrix material (here an epoxy resin system, for example). This is preferably done in an infiltration and molding tool used for this purpose, of the kind sufficiently known from the area of fiber composite technology.

In the exemplary embodiment shown, the fiber material still dry in the situation according to FIG. 2 along with the separating foil 20 is placed in a suitable infiltration and curing tool, and there infiltrated and thermally cured.

Figure 3:
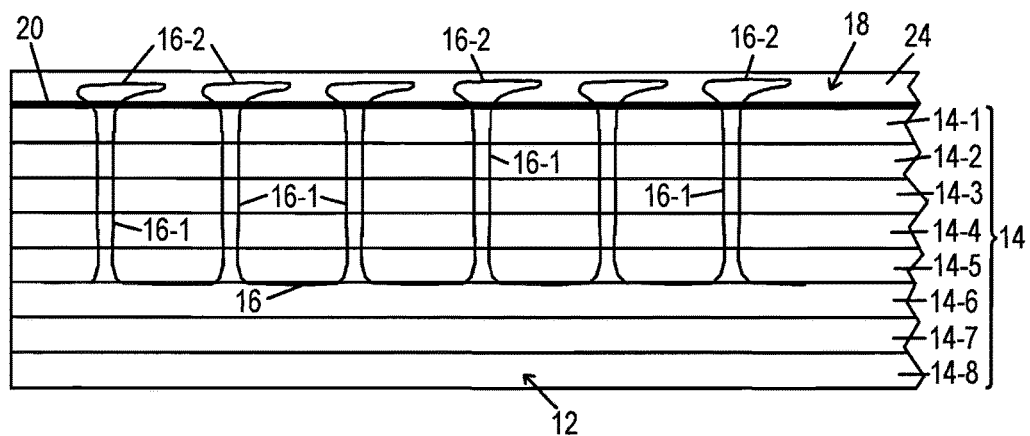
FIG. 3 is a view corresponding to FIG. 2 after infiltrated with matrix material and curing the latter.

As evident from FIG. 3, this takes place not just so as to infiltrate the semi-finished layers 14-1 to 14-8, but also to embed the thread loops 16-2 protruding on the upper side into the supplied matrix material. The matrix material layer that is created above the separating foil 20 and embeds the thread loops 16-2 is apparent on FIG. 3 and labeled 24.

When curing the matrix material in the respective molding tool, the matrix material layer 24 is correspondingly also cured.

This matrix material layer 24 located over the separating foil is later removed again, so as to thereby again expose the thread loops 16-2 on the surface area 18.

Figure 4:
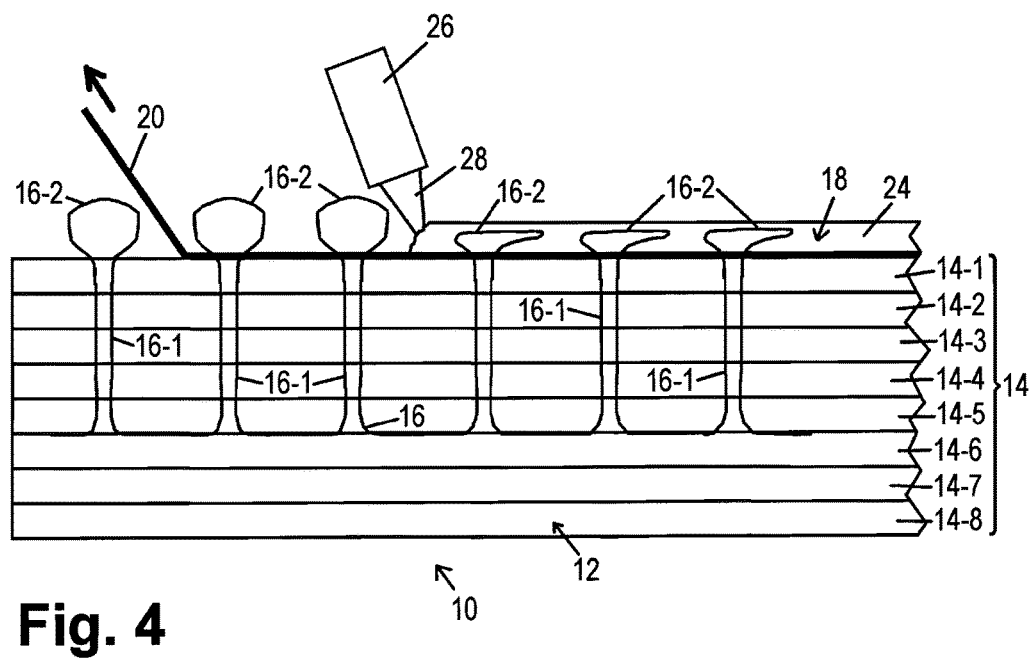
FIG. 4 is a view corresponding to FIG. 3 while removing cured matrix material so as to expose thread loops.

FIG. 4 illustrates how the thread loops 16-2 are exposed using a UV laser 26, the UV laser beam 28 of which is guided (e.g., scanned) over the matrix material layer 24, thereby chipping the latter at the sites in question and removing the resin from the thread loops 16-2. In the example shown, the separating foil 20 through which the thread loops 16-2 had previously protruded is here simultaneously peeled away as illustrated on FIG. 4 (the separating foil has a relatively low adhesive power compared to the used matrix material, which facilitates its separation from the underlying matrix material).

Within the course of the disclosure, various types of layers are possible for the described laser removal of the surface matrix material layer (e.g., see resin layer 24 on FIG. 4). When using a UV laser, the laser beam energy can be mainly absorbed in the matrix material, for example (e.g., given an epoxy resin system as the matrix material), as a result of which this material can be gently removed (e.g., evaporated). Alternatively or additionally, for example, an IR laser can be used, whose radiant energy is absorbed very intensively by the thread, e.g., when using carbon fibers for the threads. It is most often advantageous to again also remove the matrix material that got into the thread loops during the curing process and/or beforehand, e.g., as a result of capillary action, in order to make the loops as flexible as possible once more. The flexibility of the loops or the loops being free of matrix material can be advantageous, in that the adhesive can then penetrate into the thread loops better during the subsequent bonding process. The potentially used cover layer(s) can advantageously also serve to ensure that the base composite (e.g., laminate) is less influenced by the laser, and that matrix material (e.g., resin) is removed only from the thread loops, if possible.

Once the thread loops 16-2 have thus been exposed again and the separating foil 20 has been removed, the fiber composite component 10 is complete.

In particular plate-shaped or shell-shaped fiber composite components can be fabricated in this way, for example, and can later be bonded with one or more additional components (e.g., fiber composite components, but also other types of components). The thread loops protruding on the fiber composite component can here be adjusted to the respective adhesive arrangement and provided in one or several respectively correlated surface areas (for example, see surface area 18 exemplarily shown on the figures), so that these thread loops are advantageously embedded into the respective adhesive layer, so that an additional attachment of the surface area(s) to the respective adhesive layer(s) is hence realized.

As already mentioned, FIG. 5 shows such an adhesive arrangement 1, in which two plate-shaped or shell-shaped components 10, 10' were bonded via the adhesive layer 100 at their overlapping edge areas depicted on FIG. 5, e.g., to form a larger, flat structure (e.g., the outer skin structure of an aircraft). The example according to FIG. 5 on the one hand involves the fiber composite component 10 already described with respect to its manufacture, as well as the fiber composite component 10' manufactured in the same way. The configuration of the second fiber composite component 10' corresponds to the configuration of the already described fiber composite component 10. The corresponding components of the second fiber composite component 10' are denoted with the same reference numbers on the figures, but appended with an apostrophe.

In order to manufacture the adhesive arrangement 1 shown on FIG. 5, the two components 10, 10' are first fabricated in the manner already described, wherein the partial area(s) at which a respective surface area 18 or 18' with protruding thread loops 16-2 or 16'-2 is to be created are provided being adjusted to the desired configuration of the adhesive arrangement 1.

A suitable adhesive is then applied, for example to the respective surface areas 18, 18' of one of the components 10, 10', and the other component 10', 10 is correspondingly attached and, at least in the bonding area, pressed on, while the adhesive is set or (e.g., with thermal assistance) cured.

When bonding the components 10, 10', the thread loops 16-2, 16'-2 provided in the partial areas of the two components 10, 10' arranged correspondingly relative to each other advantageously protrude into the adhesive layer 100 from both sides, as illustrated on FIG. 5.

In this downstream adhesive bonding process (structural or secondary bonding), the respective adhesive flows around the thread loops 16-2, 16'-2, so that, in addition to the adhesion of the adhesive layer 100 toward the adjoining surface areas, a positive locking fit of the thread loops 16-2, 16'-2 is built up in the surrounding matrix material after the adhesive has set or cured. Given an adhesive failure of the bond, this positive locking fit advantageously offers a certain residual strength, and hence a tear stopper function, as illustrated on FIG. 6.

Figure 6:
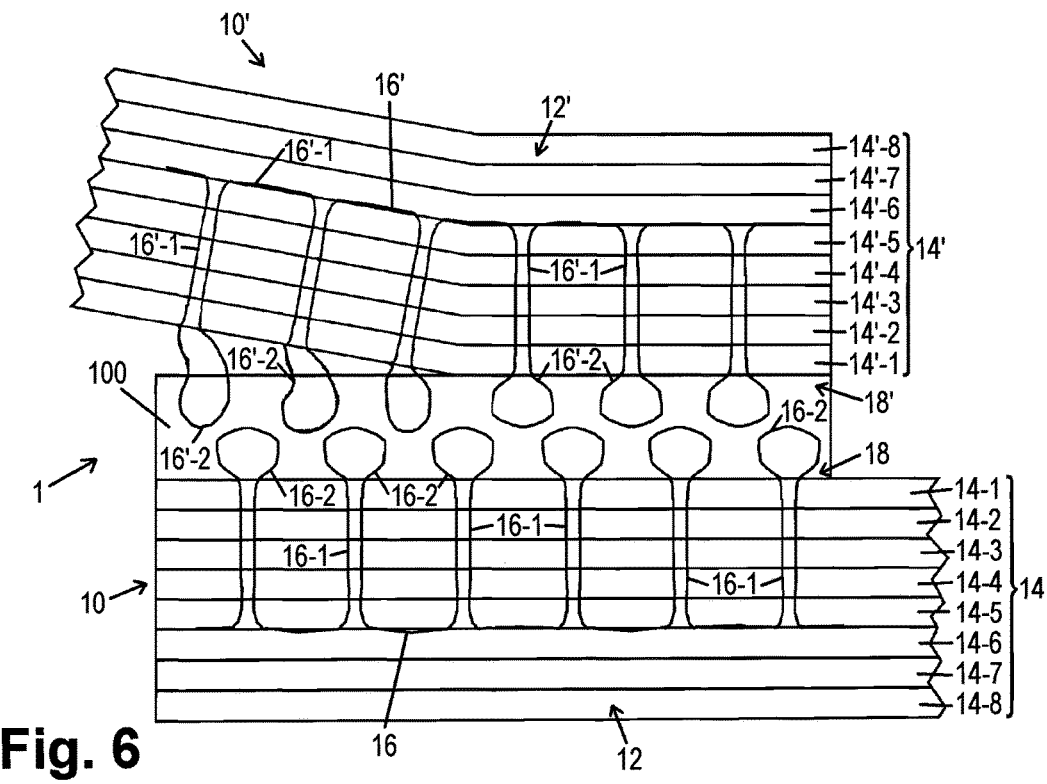
FIG. 6 is a view corresponding to FIG. 5 to illustrate a tear stopper functionality of fiber loops embedded into the adhesive layer.

FIG. 6 depicts a situation in which the adhesion of the adhesive layer 100 to the component 10' has failed, but the thread loops 16'-2 protruding from the component 10' into the adhesive layer 100 stop a tear from propagating.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a fiber composite component comprising:
  a) providing a fiber material with a separating foil on a surface area;
  b) introducing at least one thread into at least one partial area of the fiber material, such that the thread undulates as the thread extends along the surface area of the fiber material, such that sections of the thread alternately run inside of the fiber material and outside of the fiber material;
  c) infiltrating the fiber material with a curable matrix material;
  d) curing the matrix material; and
  e) peeling away the separating foil from the fiber material, so that the thread loops are free of the matrix material.

2. The method of claim 1, wherein the at least one thread includes a plurality of several fibers.

3. The method of claim 1, wherein the thread sections running outside of the composite each have a length of at least 0.2 mm.

4. The method of claim 1, wherein the thread sections running outside of the composite each have a length of at least 0.4 mm.

5. The method of claim 1, wherein at least 20% of the at least one thread runs inside of the composite and/or at least 30% of the at least one thread runs outside of the composite.

6. The method of claim 1, wherein at least 30% of the at least one thread runs inside of the composite and/or at least 40% of the at least one thread runs outside of the composite.

7. The method of claim 1, wherein the thread sections running outside of the composite in the surface area of a partial area are provided with a density of at least 5,000/qm.

8. The method of claim 1, wherein the thread sections running outside of the composite in the surface area of a partial area are provided with a density of at least 10,000/qm.

* * * * *